March 29, 1960 C. T. SHELTON 2,930,929

AUTOMATIC BEAM CONTROL FOR TELEVISION CAMERA TUBES

Filed March 20, 1959

INVENTOR,
CHARLES T. SHELTON.

BY Jack H. Linscott

ATTORNEY.

United States Patent Office 2,930,929

Patented Mar. 29, 1960

2,930,929

AUTOMATIC BEAM CONTROL FOR TELEVISION CAMERA TUBES

Charles T. Shelton, Collingswood, N.J., assignor to the United States of America as represented by the Secretary of the Army Application March 20, 1959, Serial No. 800,902

5 Claims. (Cl. 315—10)

Figure 1:
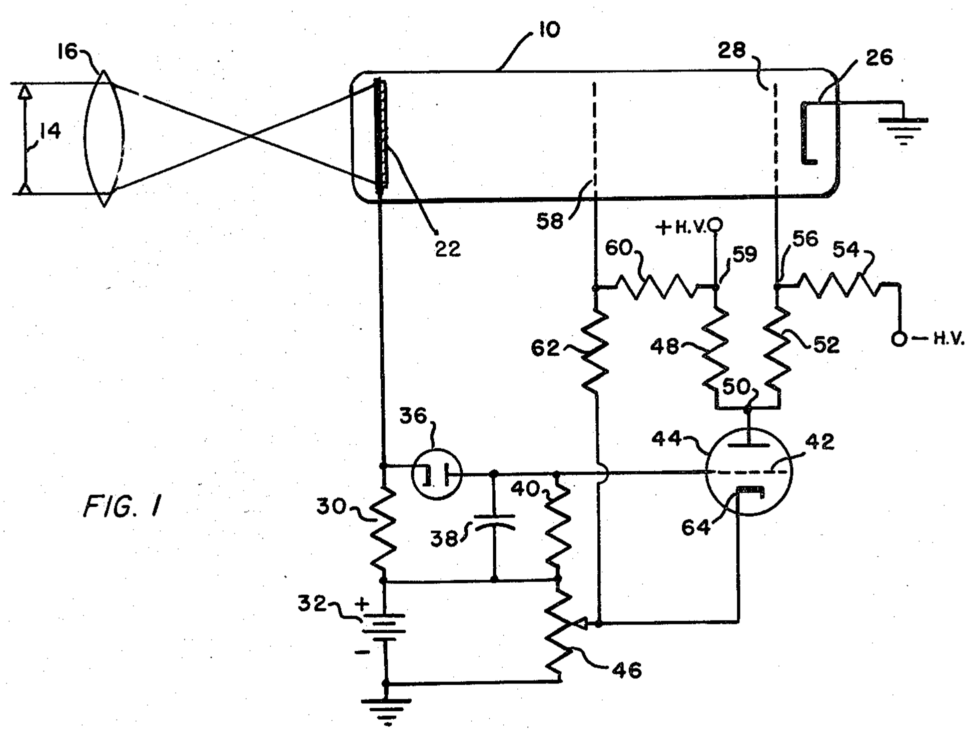

The present invention relates to a means for automatically controlling the scanning beam intensity in a television camera tube.

In normal operation the beam control within a television camera tube requires careful and often repeated adjustment to obtain optimum results, and the means heretofore utilized would not be effective wherever a television camera must be operated remotely or unattended. The present invention features the provision of a means for automatically maintaining the beam current in a television camera pickup tube at the proper value regardless of variation in the illumination, thereby providing a uniformly clean and powerful signal with a minimum of shading and, in addition, eliminating the noise due to unnecessarily high beam current under low light conditions.

Broadly, this in accomplished by measuring the peak signal output of a vidicon camera tube and applying it to the grid of an amplifier. The amplified signal is applied to the control grid of the vidicon tube in such a way that an increase of signal level causes an increase in beam current. If the vidicon tube is operating in a region where there is incomplete discharge of the target, an increase in beam current causes an increase of signal output. Therefore, in this region the process is regenerative. If the amplifier gain is high enough the system is unstable in the region where the target is not fully discharged and the beam current will continue to build up until the target is fully discharged. At this point a further increase of beam current does not cause an increase of signal so the regenerative process ceases. However, to prevent an increase of beam current beyond the minimum amount required for discharge of the target, a degenerative or inverse feedback is added by sampling the beam current at some electrode which collects part of the beam current. The degenerative signal does not saturate but will continue to increase as long as the beam current increases. The degenerative signal is lower in amplitude than the regenerative signal in the partial discharge region so that the system is unstable. However, when full discharge of the target is reached, the regenerative process ceases and the degenerative process prevents further beam current increase; therefore, the system is stable at the point of full discharge of the target. Thus proper beam current is automatically maintained. If light level or pickup tube sensitivity should change, or some other drift occur, the system will shift to the new stable point.

One object of the present invention, therefore, is to provide a means for automatically controlling the grid bias in a camera tube.

Another object of the invention is to provide means for utilizing a portion of the beam current of a low-velocity scanning-beam type television camera tube so as to control the beam intensity of the tube.

Figure 2:
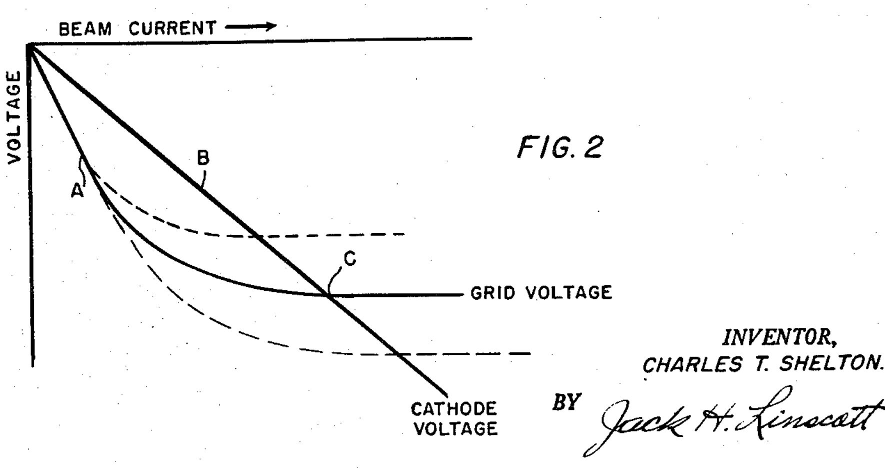

For a more detailed description of the invention, together with other and further objects thereof, reference is had to the following description taken in conjunction with the accompanying drawing wherein:

Fig. 1 is a schematic illustration of a vidicon camera tube and a circuit showing an embodiment of the present invention; and Fig. 2 is a family of curves which is referred to in explaining the operation of the circuit of Fig. 1.

Referring to Fig. 1, there is shown a television pickup or camera tube 10 of the vidicon type which makes use of a photoconducting material on a target which is characterized by a resistance that decreases upon exposure to light. In this regard attention is directed to Fig. 1 which shows a tube 10 that includes a target or signal plate 22 on which an image of an object 14 is focused by means of a lens 16. The optical image is focused on target 22, as shown, and the photoconductive material on the target is scanned with an electron beam. Such means may be any conventional electron gun at the opposite end of tube 10 and includes a cathode 26 and a grid 28. The beam deflecting means of tube 10 is conventional and is consequently omitted from the drawing.

As the scanning beam travels across the surface of the photoconductor material on target 22, just enough electrons are deposited on each spot that it touches to reduce the potential of that side of the photoconductive material to cathode potential. However, during the interval between successive scans, the charge deposited on the target leaks through the photoconducting material at a rate determined by the intensity of the illumination to which this part of the photoconducting material is subjected. Hence the charge deposited on any particular part of the photoconducting material the next time it is scanned will be sufficient to replace those electrons that have been lost by leakage since the last passage of the electron beam. The result is that as the electron beam scans the surface of the photoconductive material on the target 22, the charge it deposits varies with time in accordance with the variations in the illumination of the successive elements of the photoconductive film.

For a detailed description of the circuit embodying the principles of this invention reference is further directed to Fig. 1 which shows a resistor 30 and a low voltage source 32 connected in series between target 22 and ground. A diode detector 36 is provided having its cathode connected to target 22 and its plate or anode connected to the positive terminal of voltage source 32 through the parallel arrangement of capacitor 38 and resistor 40. Connected across the source 32 is a potentiometer 46, the center arm of which is connected to cathode 64 of amplifier tube 44. Grid 42 of amplifier tube 44 is connected to the plate of diode detector 36. The anode of amplifier 44 is connected through resistor 48 to the positive terminal of a high voltage source which, in turn, is connected through resistor 60 to a grid electrode 58 of tube 10. As shown, electrode 58 is positioned intermediate the control grid 28 and target 22 to develop a potential proportional to the electron beam current. Electrode 58 is connected to cathode 64 through isolation resistor 62. The plate of amplifier tube 44 is also connected to the camera tube control grid 28 through resistor 52 which is also in series arrangement with resistor 54 which, in turn, is connected to a negative high voltage source. Tube 44 is designed for substantially linear operation so that an increase, for example, in the negative bias on grid 42 with respect to cathode 64 produces a proportional decrease in current through load resistor 48. Such a decrease in the plate current of tube 44 causes a proportional increase in the positive potential at point 50. The values of resistors 48, 52, and 54, are preferably so chosen that point 56 is of negative polarity regardless of the operating status of tube 44, the point 56 being connected to camera tube control grid 28. In other words, resistors 48 and 52 together are greater in value than resistor 54 by such an amount that point 56 (and thus grid 28 of the camera tube 10) remains negative with respect to cathode 26 even when point 50 is at its maximum positive potential, as occurs when minimum current is passing through load resistor 48.

In the operation of the device, electrons collected by target 22 flow to ground through resistor 30 and low voltage source 32, and then return to cathode 26 to complete the circuit. With no beam current the diode detector 36 is biased so that it draws no current but, with beam current, the flow of electrons from target 22 will cause a current flow through resistor 30 in such a direction that the anode of diode detector 36 will be made positive relative to the diode cathode. With the diode detector 36 drawing current, condenser 38 will charge exponentially in the conventional manner, the charge being of such polarity that the upper plate of the condenser (as viewed in the drawing) is negative. It is to be understood that the time constant of 38—40 is long enough to integrate one frame of video. The voltage developed across condenser 38 is applied to the grid 42 of amplifier 44, and as a result the voltage derived from point 50 tends to increase to provide positive feedback. Simultaneously, the beam current impinges on electrode 58 to provide a negative potential which is applied to cathode 64 through isolation resistor 62 and produces an increase in plate current through resistor 48 so that the voltage at point 50 becomes more negative to provide negative feedback. This is a linear relationship and is shown in curve B. In turn, point 56 becomes more negative and, consequently, grid 28 of tube 10 becomes more negative, thus decreasing the beam current.

From the above it can be seen that the diode detector 36 is used to measure peak video, and this level is fed to the control grid 28 of the vidicon tube in such a way that as long as peak video is increasing, camera tube beam current is increasing. From curve A of Fig. 2, it may be observed that this grid voltage increases at a faster rate than the cathode voltage until full discharge of target 22 occurs, and, at this point the grid voltage applied through diode detector 36 becomes constant. Thus, when peak video ceases to increase, the proper level of beam has been reached. To stabilize the beam at this point (point C in Fig. 2), the negative feedback of a sample of beam current obtained from electrode 58 is applied to the grid 28 as the controlling voltage. The dotted lines show the variation of grid voltage for different light levels. For different saturation levels of grid voltage, the circuit will have a different stable point so that near optimum beam current will be maintained.

While the specific embodiment herein has been directed specifically to a vidicon camera tube, it is obvious that the invention can be equally applied to any low-velocity scanning-beam type television camera tube.

While there has been described what is at present considered a preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In a control system for a camera tube of the low velocity electron beam scanning type including means to control the beam current and a target which intercepts said beam, the discharge current derived from said target being dependent on the light intensity impinging on said target, capacitive storage means responsive to said discharge current for developing a voltage thereacross, means for developing a potential proportional to said beam current, and means in circuit with said last mentioned means and said capacitive storage means whereby said storage voltage is applied regeneratively to said control means, and said proportional potential is applied degeneratively to said control means, said proportional potential having exclusive control to stabilize said beam current at a point where the voltage developed across said storage means corresponds to maximum light intensity.

2. A system of the kind set forth in claim 1 wherein said capacitive storage means comprises a capacitor in parallel arrangement with a resistor and a diode detector interconnecting said parallel arrangement and said target.

3. In a control system for a camera tube of the low velocity electron beam scanning type including means to control the beam current and a target which intercepts said beam, the discharge current derived from said target being dependent on the light intensity impinging on said target, means comprising a capacitor and a diode detector interconnecting the output of said target to said capacitor for developing a voltage thereacross responsive to said current discharge, means including a grid electrode for developing a potential proportional to said beam current, and means in circuit with said last mentioned means and said capacitor whereby said capacitor voltage is applied regeneratively to said control means and said potential is applied degeneratively to said control means, said proportional potential having exclusive control to stabilize said beam current at a point where the voltage developed across said capacitor corresponds to maximum light intensity.

4. A system of the kind set forth in claim 3 wherein said grid electrode is intermediate said beam control means and said target.

5. A system of the kind set forth in claim 4 wherein the means in circuit with said last mentioned means comprises an amplifier having at least a plate, grid and cathode, said proportional potential being applied to said cathode and said capacitor voltage being applied to said grid, and said plate being in circuit with said control means.

References Cited in the file of this patent

UNITED STATES PATENTS 2,786,960 Palmer ---------------- Mar. 26, 1957